INVENTOR.
PER NYROP
BY Theodore M. Jablon
ATTORNEY.

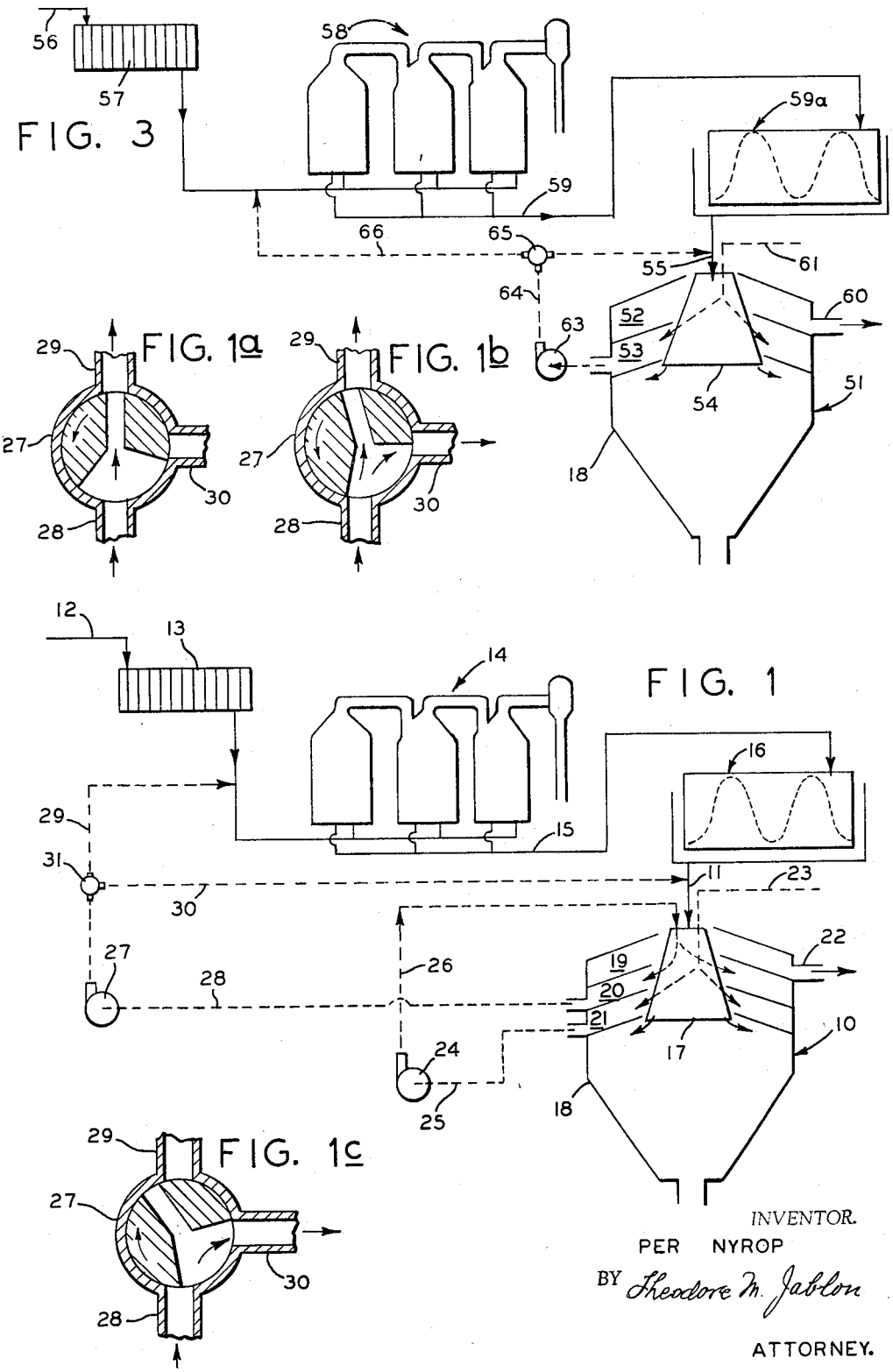

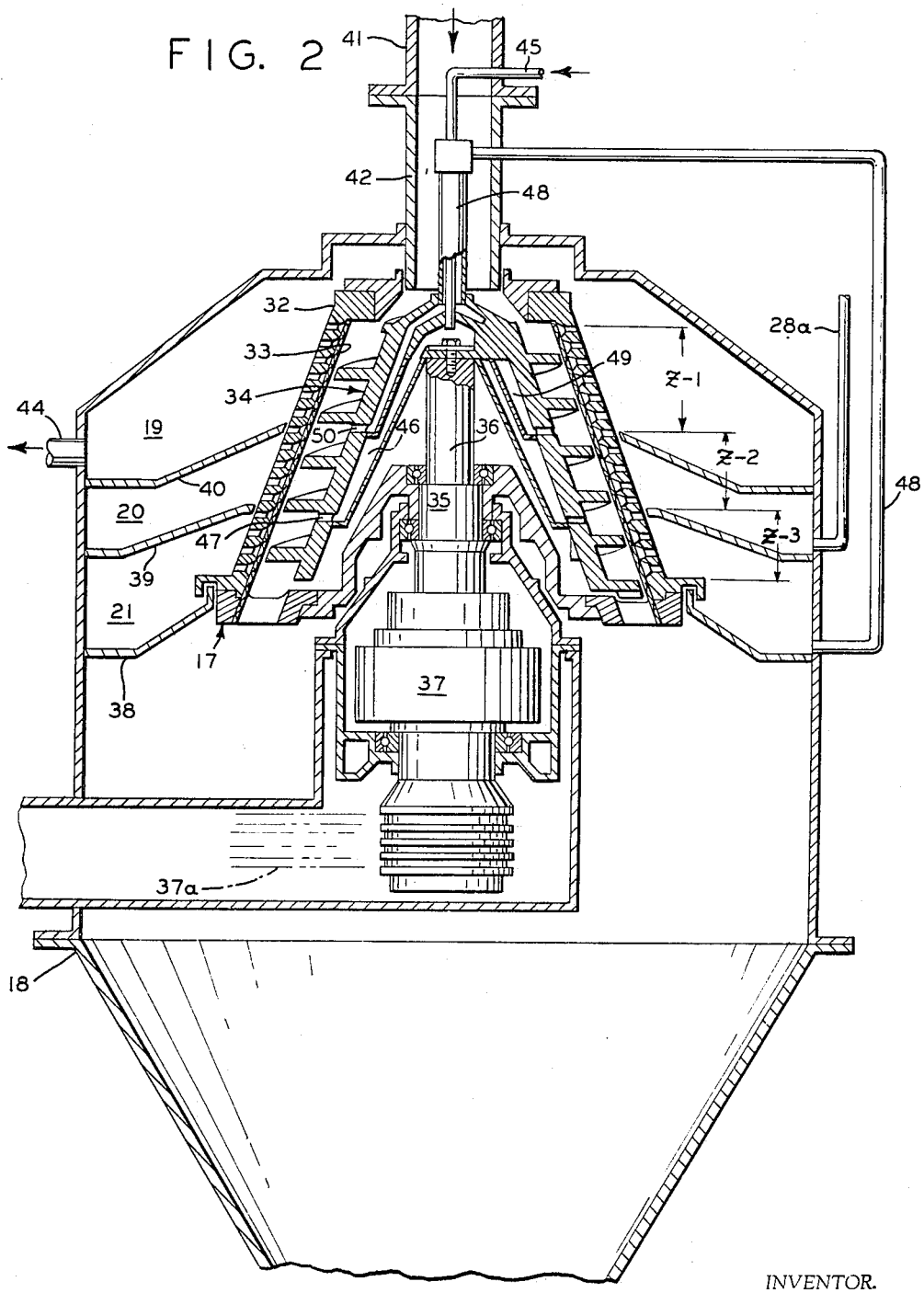

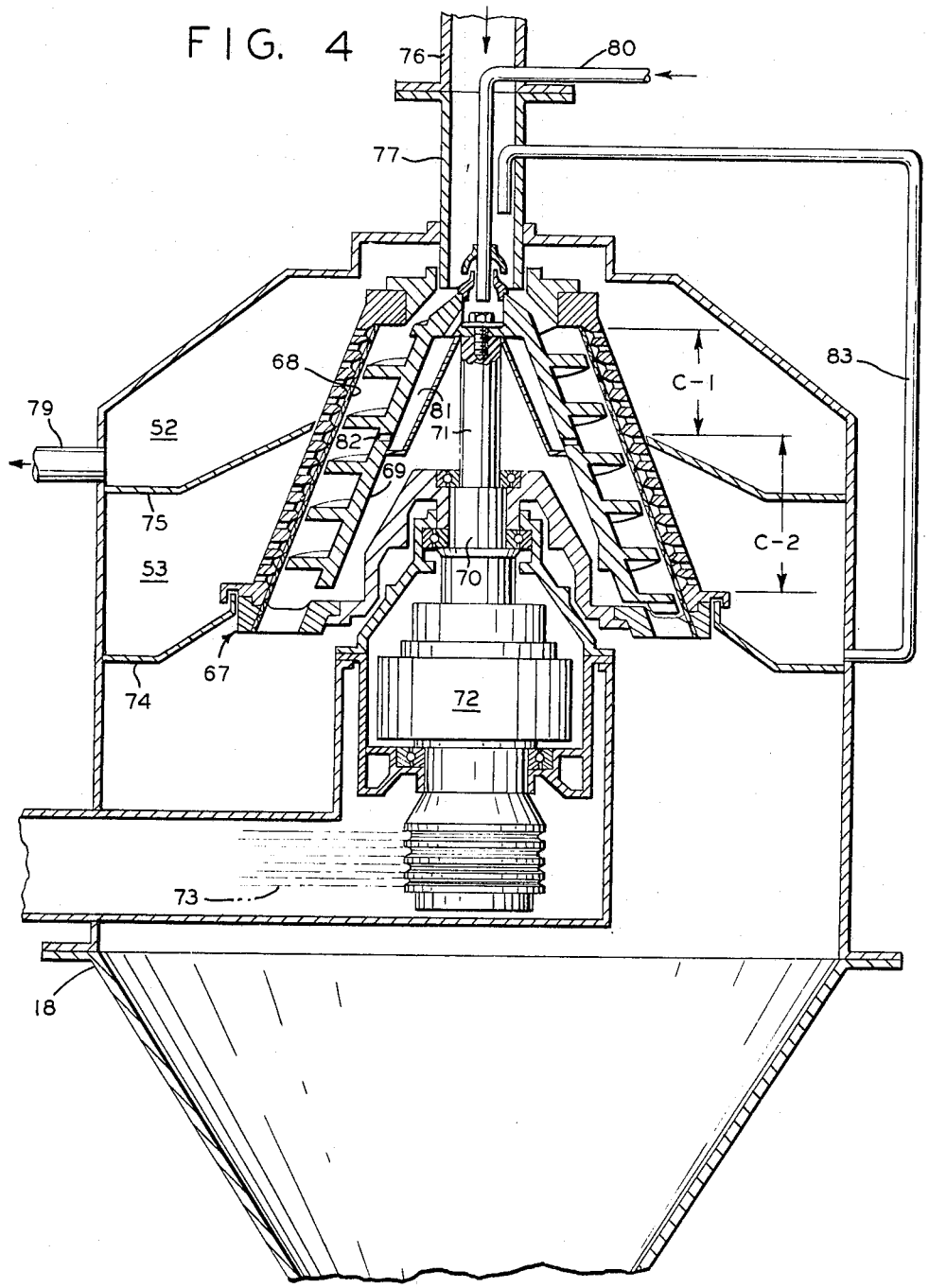

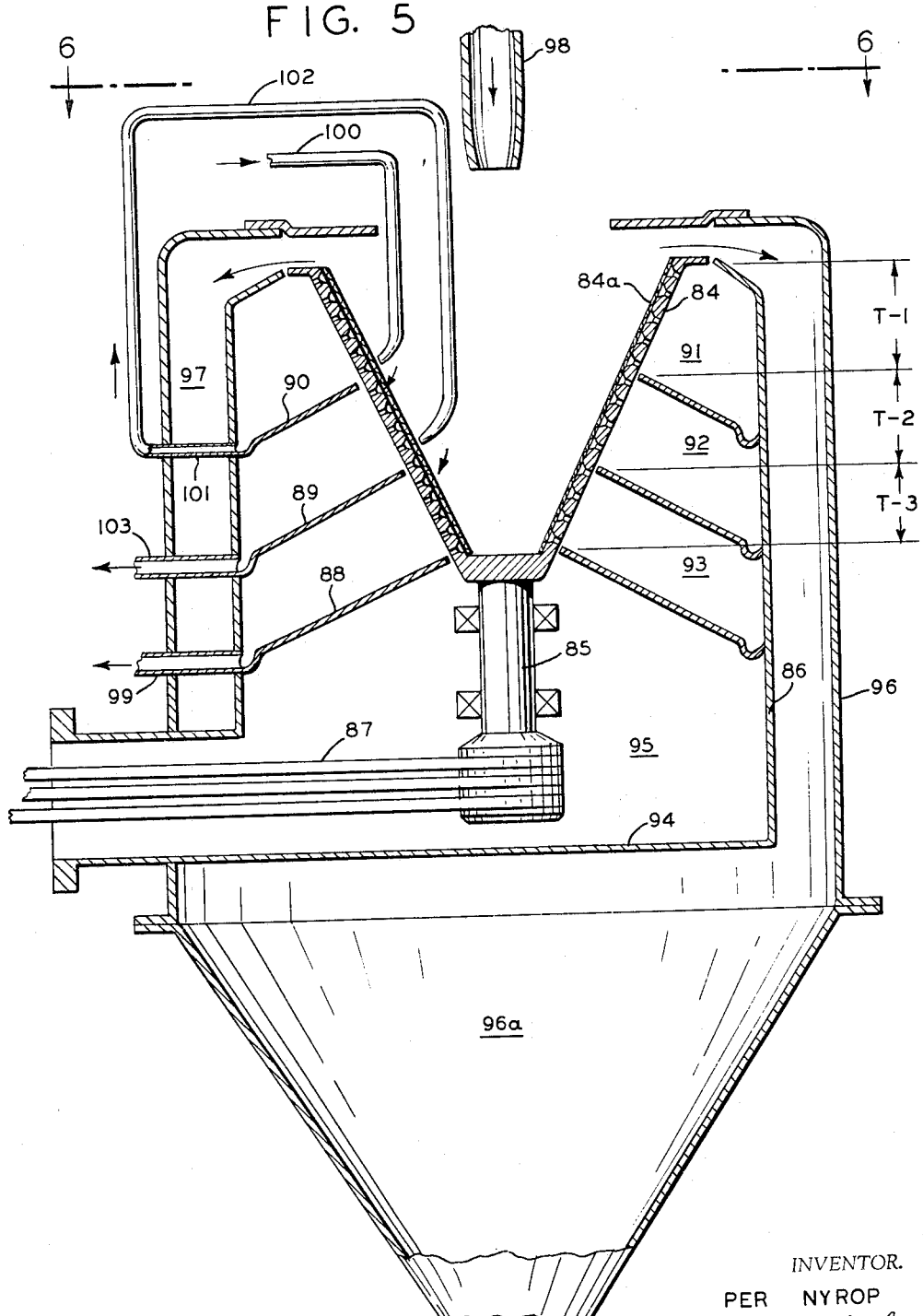

United States Patent Office 3,289,843
Patented Dec. 6, 1966

3,289,843
APPARATUS FOR CENTRIFUGAL SCREENING
Per Nyrop, Norwalk, Conn., assignor to Dorr-Oliver
Incorporated, a corporation of Delaware
Filed Mar. 19, 1964, Ser. No. 353,136
1 Claim. (Cl. 210—196)

This invention relates to improvements in the centrifugal screening of pulps or slurries, whereby treatment liquid or mother liquor is first separated from the solids, and the solids on the screen are then subjected to a washing operation for removing therefrom residual treatment liquor or the like before being discharged from the screen.

While this invention may be employed in a variety of treatment processes involving the centrifugal separation of pulps or slurries, it is herein preferably described and illustrated in connection with the centrifugal screening of a sugar crystal slurry produced by the evaporation and crystallization treatment of sugar juices.

More particularly, the invention relates to the operation of continuous screening centrifuges one example of which is the one wherein the rotor structure comprises a screen of perforated sheet metal form fitted into and retained in a cone-shaped cage member. This cage member is mounted for rotation in a housing which collects the separated liquid during passage of the slurry solids from end to end of the screen. For example, one type of continuous machine herein shown as illustrative of the invention, is provided with a solids conveying scroll member rotating coaxially within the screen. Another example is a machine so constructed and arranged as to utilize the contrifugal force for effecting the movement of the solids from the narrow feed end to the wide discharge end of the screen, without the aid of such a conveying member.

A feed suspension, for instance a sugar crystal slurry, upon entering the narrow end of the screen is at once subjected to centrifugal forces effecting the separation of the mother liquor while the solids move along the conical surface of the screen towards the wide discharge end thereof. Following this liquor separation, as the crystals continue being moved steadily towards the discharge end of the screen, wash water is applied in a washing zone internally of the screen, whereby the crystals are washed free of residual liquor and of impurities thereon. However, because of the continuous progressive movement of the crystals through this washing zone and the thus limited detention time, the effectiveness of this wash depends largely upon the amount of wash water that is being applied.

However, any increase in the amount of wash water will also increase the amount of sucrose that may become redissolved from the crystals, while increasing not only the water consumption, but also the load upon the evaporators.

Therefore, it is among the objects of this invention to increase the efficiency of the washing phase in continuous centrifugal screening apparatus, so that the aforementioned drawbacks will be minimized, and to do so by simple and relatively inexpensive means. In the case of sugar crystal slurry, this means that by the practice of this invention a higher yield of crystallized sugar is obtainable from the operation at lower operating cost.

According to the invention, the foregoing objects are attainable in continuous centrifugal screening apparatus by subjecting the pulp or slurry solids to a counter-current washing operation during their movement from the liquor separating phase towards the solids discharge end of the screen.

To this end, the screen of the rotor structure of this invention is functionally subdivided into a plurality or sequence of transverse treatment zones through which the wash liquid is caused to pass sequentially in counter-current movement to the movement of the solids upon the screen. The initial zone at the narrow end of the screen receives the feed suspension or sugar or crystal slurry so that the mother liquor may be separated centrifugally in that zone as far as possible. This mother liquor is collected in a corresponding surrounding receiving chamber of the housing whence it may be discharged as strong liquor or "greens" for further recovery of crystallizable sucrose. The remaining subsequent treatment zones on the screen are operated as counter-current washing zones each of which in turn is surrounded by a corresponding solution receiving chamber of the housing.

In one embodiment, fresh water is applied to the terminal zone at the solids discharge end of the screen. The resulting first wash liquor from that zone is collected in a corresponding surrounding chamber of the housing. After removal from that chamber this first liquor is appiled to the solids in an intermediate zone on the screen. The resulting second wash liquor collected in the respective associated surrounding chamber, may be subjected to suitable recovery treatment.

Other features and advantages will hereinafter appear.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim, or of forms that are its functional as well as conjointly cooperative equivalents, are therefore intended to be embraced by the claim.

FIG. 1 is an example of a flowsheet embodying the screening centrifuge of this invention adapted for three-zone treatment of a crystal slurry or the like;

FIGS. 1a, 1b and 1c show greatly enlarged details of a flow control valve device adapted for use in the flowsheet of FIG. 1;

FIG. 2 is an enlarged vertical sectional detail view of the screening centrifuge of this invention, diagrammatically indicated in FIG. 1;

FIG. 3 is a flowsheet embodying the invention in a screening centrifuge providing two-zone counter-current treatment of a pulp or slurry;

FIG. 4 is an enlarged vertical detail view of the screening centrifuge of this invention diagrammatically indicated in FIG. 3;

FIG. 5 is a vertical sectional view of a different type of continuous screening centrifuge illustrating the invention;

Figure 6:
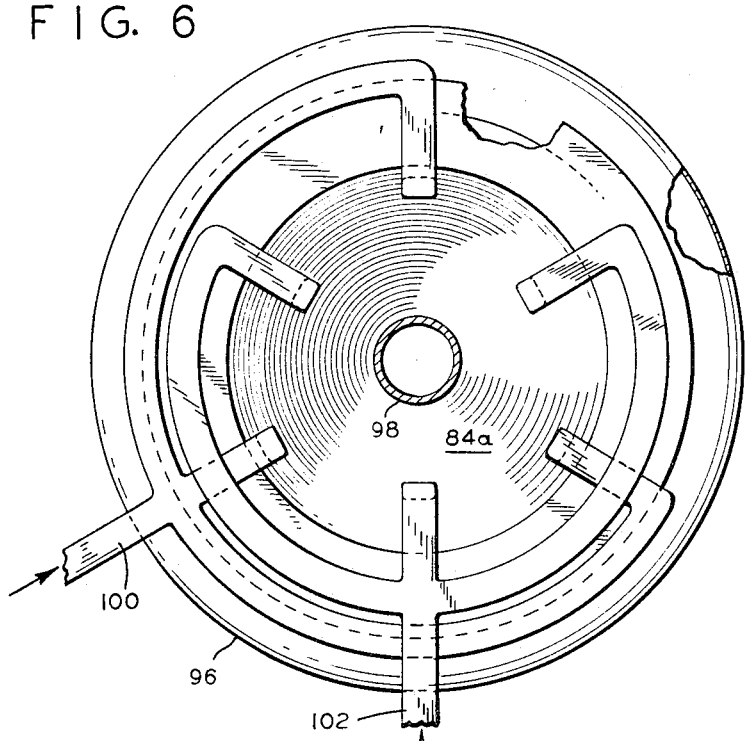
FIG. 6 is a top view taken on line 6—6 in FIG. 5.

According to the flowsheet in FIG. 1, the invention is exemplified in connection with the centrifugal treatment of a slurry of sugar crystals derived from a supply of sugar juice. Accordingly, there is provided a screening centrifuge 10 receiving a feed slurry indicated at 11 derived from a supply sugar juice. According to this example, the sugar juice at 12 is passed through a filter 13, for example a pressure filter eliminating suspended impurities from the juice. The thus filtered juice still containing certain impurities suspended, colloidal, and dissolved, is then subjected to what may be a conventional type of evaporation treatment in the evaporator 14. The hot slurry resulting from this treatment leaving the evaporator station at 15 is then mingled for a period of time in a cooling type crystallizer unit 16. The resulting crystal slurry 11 then enters the screening centrifuge 10.

The screening centrifuge as diagrammatically shown in the flowsheet of FIG. 1 comprises an upright screen rotor structure 17 of trunco-conical configuration surrounded by a housing 18. The upper portion of the housing is subdivided into three sequential receiving chambers 19, 20 and 21 for collecting the zone-wise centrifugally separated liquors, while the solids move steadily along the screen for discharge at the wide end thereof into the hopper-shaped lower portion of the housing.

As the feed slurry, for example a crystal slurry derived from sugar juice, enters the upper narrow feed end of the rotating screen, it is at once subjected to centrifugal forces causing most of the mother liquor to be separated through the screen into the initial receiving chamber 19 to be discharged therefrom at 22. From there, this separated mother liquor may be sent to a secondary evaporator station for further recovery of sucrose in crystal form.

Following this separation of the mother liquor the solids on the screen continue moving from the first treatment zone defined by the initial receiving chamber 19 sequentially through the next two treatment zones defined by the respective receiving chambers 20 and 21 surrounding the rotor structure. A wash 23 is applied internally of the screen to the respective treatment zones following the separation of the motor liquor, for washing the sugar crystals free of impurities in countercurrent fashion. To this end, fresh wash liquid is applied to the terminal treatment zone at the wide end of the screen, and the resulting first wash solution centrifugally passing through the screen is collected in the terminal receiving chamber 21. From there, this first solution is returned to the interior of the screen rotor structure and applied to the intermediate treatment zone on the screen. A pump 24 and return ducts 25 and 26 are indicated for that purpose.

The resulting second or spent wash solution centrifugally passing through the intermediate treatment zone on the screen and containing sucrose along with impurities is collected in the intermediate receiving chamber 20. Further sucrose recovery can then be made by returning this solution to the evaporating station 14 as indicated by a pump 27 and conduits 28 and 29. A controllable portion of this return solution may be diverted as by branch conduit 30 for reintroduction into the centrifuge along with the feed slurry if dilution of the slurry is desired. For this purpose, a control valve 31 is provided in conduit 29, various control positions of which are shown in the detail of FIGURES 1a, 1b and 1c.

The screening centrifuge 10 of the flowsheet of FIG. 1 is shown in FIG. 2 greatly enlarged, and structurally detailed and implemented to embody the invention.

Accordingly, the screen rotor structure 17 comprises a truncated cage member 32 containing a screen member 33. Within the screen member and concentric therewith operates a spiral conveyor member 34 conically shaped to cooperate with the screen. The cage member with a screen on the one hand, and the conveyor member on the other hand, are mounted on concentric shafts 35 and 36 respectively. Since these shafts are rotated at differential speeds relative to each other, by means of a differential drive unit 37 engaged by drive belt means 37a, the conveyor member will impart movement to the crystals adhering centrifugally to the screen until they discharge from the wide end of the screen into the lower hopper-shaped portion of the housing 18.

The upper and the lower portion of the housing are separated by an annular partition or bottom shelf 38. The upper housing portion in turn is divided by annular partitions or intermediate shelves 39 and 40, providing the aforementioned annular receiving chambers 19, 20 and 21. These receiving chambers in turn define sequential treatment zones namely the initial strong liquor zone Z–1, a first washing zone Z–3, and the second or intermediate washing zone Z–2.

Feed pipe 41 introduces the feed slurry through a stationary feedwell 42 to the initial separating zone Z–1 on the screen. The separated strong liquor or "greens" discharges from chamber 19 as at 44, and may be further processed as in a secondary evaporator station (not shown) for sucrose recovery in the form of sugar crystals. The crystals reaching the end of zone Z–1 are substantially free of mother liquor.

A pipe 45 supplies fresh wash liquid or water to the conveyor member which has wash water ducts 46 communicating with delivery openings 47 through which the wash liquid is projected from the conveyor member against the solids in zone Z–3 on the screen. It will be seen that the location of these discharge openings 47 is such as to cause the first wash liquor to be collected in the receiving chamber 21. From there, suitable transfer means including a pump, but here merely indicated by a return conduit 48, will recirculate this first wash liquor to the intermediate zone Z–2 on the screen. For this purpose, the terminal portion of return conduit 48 surrounds the fresh water feed pipe 45 and delivers the first wash solution into the conveyor member which for this purpose is formed with additional internal ducts 49 substantially paralleling the first mentioned wash water ducts 47 therein.

The ducts 49 communicate with delivery openings 50 through which this first wash liquor is projected from the conveyor member against the solids in the intermediate zone Z–2 on the screen. Again, the location of the delivery openings 50 is such as to cause the resulting second or spent wash liquor to be collected in the intermediate receiving chamber 20. From there the solution is delivered through discharge conduit 28a and may be returned to the evaporation station 14. A controllable part of this spent solution may be diverted for reintroduction into the screen rotor structure together with the feed slurry entering the same in case dilution of the feed slurry is desired and as indicated above in FIG. 1.

Figure 2A:
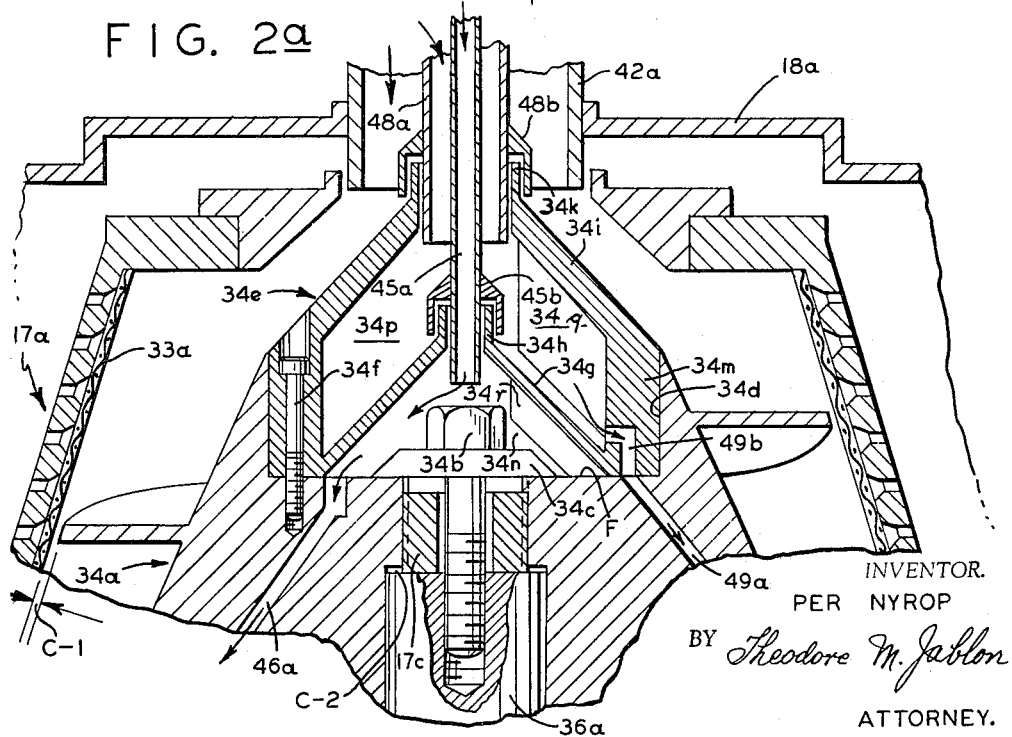
FIG. 2a shows further enlarged details of FIG. 2.

FIG. 2a is a greatly enlarged detail view of the top end portion of the rotor screen structure 17 of FIG. 2, with the spiral conveyor member rotating therein. This enlarged view shows a greater structural detail of the conduit arrangement whereby the return wash liquors are introduced from stationary pipes into the rotary conveyor structure from which they issue in the respective zones of the screen previously described. An associated portion of the housing structure is also shown.

Accordingly, a shaft 36a is shown carrying the spiral conveyor structure 34a fastened thereto by means of bolt 34b tightened against a washer member 34c.

The top end of the conveyor member is formed with an axially directed cylindrical recess 34d which has a flat bottom F, and into which is fitted a flow distribution member 34d secured therein by bolts 34f.

This flow distribution member has a conical bottom portion 34g formed with neck 34h, and a similarly conical top portion 34i formed with a neck 34k, both top and bottom portions being interconnected by a cylindrical body portion 34m. Thus, when this flow distribution member is in place, it constitutes with bottom F of the recess a lower inflow chamber 34n, whereas the conical top and bottom portions define an upper inflow chamber 34p. Vanes 34q and 34r are provided in the respective inflow chambers.

A stationary central pipe 45a (corresponding to pipe 45 in FIG. 2) extends with clearance through neck 34h for delivering the fresh wash water into the lower inflow chamber and then through duct 46a to the washing zone Z–3 (see FIG. 2) as previously described. Pipe 45a has fastened thereto a shield or bell 45b surrounding the neck 34h with clearance.

A larger stationary pipe 48a (corresponding to pipe 48 in FIG. 2) extends with clearance through neck 34k to deliver the collected first wash liquor into the upper inflow chamber 34p and then through passage 49b and duct 49a to the intermediate washing zone Z–2 (see FIG. 2) as previously described. Pipe 48a has fastened thereto a shield or bell 48b surrounding the neck 34k with clearance.

The stationary feedwell 42a surrounding the pipe 48a is indicated as corresponding to the feedwell 42 in FIG. 2, being mounted on the housing structure here indicated at 18a.

The screen rotor structure 17a has mounted therein the screen element 33a proper (corresponding to the rotor structure 17 and screen element 33 in FIG. 2).

The clearance C–1 between the spiral flights of the conveyor member and the surrounding screen element is made adjustable by the provision of an annular member 17c surrounding the bolt 34b and threaded into the conveyor member. Adjusting this member by turning it in the one direction or in the other direction will correspondingly vary the adjacent clearance C–2 between the top end of the shaft and the conveyor member, and accordingly will vary the screen clearance C–1.

The embodiment of FIG. 3 diagrammatically illustrates a screening centrifuge 51 which although generally similar to the one described above, provides for a mode of counter-current operation by an arrangement of only two annular liquid or filtrate receiving chambers 52 and 53 surrounding the screen rotor 54 and correspondingly defining two sequential and mutually adjoining treatment zones on the screen.

This counter-current operation too may be exemplified in connection with the treatment of a crystal slurry 55 derived from the evaporation and crystallization treatment when a sugar juice supplied at 56 is passed through a suitable filter 57 here illustrated as a pressure filter eliminating suspended impurities from the juice. The filtered juice is then subjected to treatment in the evaporator station 58.

The hot slurry 59 leaving the evaporator station is then further crystallized in the cooling type crystallizer-mingler unit 59a. The resulting further developed crystal slurry 55 then enters the screening centrifuge 51.

The upper cylindrical portion of the housing is subdivided into two sequential filtrate receiving chambers 52 and 53 for liquid to be separated centrifugally from a pulp or slurry by the screen as the solids move steadily along the screen surface for delivery from the wide end thereof into the hopper-shaped lower portion of the housing. As the slurry enters the feed end of the rotating screen it is at once subjected to centrifugal forces causing most of the strong liquor or mother liquor to be separated through the screen into the initial receiving chamber 52 to be discharged therefrom through exit 60.

Following the separation of this primary liquor the solids on the screen continue moving from the initial treatment zone into the next adjoining or second treatment zone defined by the second receiving chamber surrounding the rotor structure. Wash liquid 61 is applied internally of the screen to the second treatment zone for washing the solids free of impurities, the resulting spent wash solution leaving the second receiving chamber at 53. This spent solution is added in part or all to the feed slurry entering the rotor structure, depending upon the extent that any dilution of the feed slurry is desirable. Reintroduction of the spent liquor or weak solution is indicated by a pump 63 provided in return line 64. A control valve device or splitter 65 is provided to allow for this weak solution to be sent partially back into the machine and partially to be returned to the evaporator station as through a branch line 66.

The screening centrifuge diagrammatically indicated in FIG. 3 is shown greatly enlarged and more fully implemented in FIG. 4.

Accordingly, the screen rotor comprises a truncated cage member 67 containing a screen member 68 of conforming configuration. Within the screen member and concentric therewith operates a spiral conveyor member 69 conically shaped to cooperate with the screen. The cage member and the conveyor member are mounted respectively on concentric shafts 70 and 71. Since these shafts are rotated at differential speeds relative to each other by means of differential drive unit 72 engaged by drive belt means 73, the conveyor member will impart movement to the solids on the screen until they discharge from the wide end thereof into the lower hopper-shaped portion of the housing.

The upper portion of the housing surrounding the rotor structure has partition or bottom shelf 74 and an intermediate annular partition or shelf 75 providing the aforementioned annular receiving chambers 52 and 53. These chambers in turn define sequential treatment zones, namely the initial strong liquor separating zone C–1 and washing zone C–2.

Feed pipe 76 is provided for introducing the feed slurry into a stationary feedwell 77 and then to the initial separating zone C–1 on the screen. The separated strong liquor then discharges from chamber 52 at 79, and may be subjected to further recovery treatment not shown.

Another pipe 80 supplies wash water to the conveyor member which for that purpose is provided with ducts 81 having delivery openings 82 through which the wash water or liquid is projected from the conveyor member against the solids passing through zone C–2 on the screen. It will be seen that the location of these discharge openings is such as to cause the first wash liquor to be collected in the receiving chamber 53. From there, suitable transfer means including a pump or the like, but here merely indicated by a return conduit 83, will recirculate the first wash liquor to the feedwell 77 for mixing with the pulp or slurry feed to the machine.

According to the example in FIGS. 5 and 6, the three-zone treatment operation in FIGS. 1 and 2 has been embodied in a type of screening centrifuge capable of operating without the provision of a conveyor member within the screen. The machine therefore comprises a cage member 84 which is inverted with the solids discharge from the wide end at the top. The conically shaped conforming screen element 84a is held within this cage. The narrow end of the cage member has a hub portion connected to a shaft 85 mounted for rotation in an inner housing 86, and is driven as indicated by belt drive 87. This inner housing has provided in it three annular partitions or shelves 88, 89 and 90 surrounding the rotor structure to constitute with the inner housing three filtrate receiving chambers 91, 92 and 93. These receiving chambers in turn define three treatment zones T–1, T–2, and T–3 upon the screen.

This inner housing 86 has a bottom 94 defining between it and the lower shelf 88 a chamber 95 accommodating the shaft mounting and the drive connection thereof.

An outer housing 96 surrounds the inner housing 86 so as to constitute therewith a peripheral passage 97 through which solids discharging from the wide end of the screen may pass downwardly for collection in the hopper-shaped lower portion 96a of the housing 96. The conicity of the screen member is such as to cause the solids or crystals on the screen surface to be transported by the centrifugal force upwardly thereon to the discharge end thereof.

A feed pipe 98 supplies the feed slurry or pulp to the narrow end of the screen. Since the pulp is at once subjected to centrifugal effects in the initial entrance zone T–3 of the screen, the mother liquor or the like is largely separated in that zone and collected in the surrounding chamber 93 to be discharged therefrom through conduit 99. As the solids continue moving along the surface of the screen thus passing through the treatment zones T–2, and T–1, they are subjected to the counter-current washing operation, finally to be discharged from the wide top end of the screen through the vertical cylindrical passage 97 down into the hopper-shaped bottom portion 96a of the housing.

To that end, a stationary feed pipe or a feed pipe system 100 (see FIG. 6) supplies fresh wash liquid to the terminal treatment zone T–1, so that the resulting first wash liquor is collected in the surrounding chamber 91 for discharge through a conduit 101. Suitable flow transfer means are provided, but are here merely indicated by a pipe or pipe system 102, whereby the first wash liquor is reintroduced into the interior of the screen and applied to the solids passing through the intermediate treatment zone T–2. The resulting second or spent wash solution is collected in the intermediate chamber 92 for discharge through a conduit 103 from which it may be returned to the evaporator station 58.

It will be understood that each of the elements described above, or two or more together, may also find a useful application in other types of centrifugal screening apparatus differing from the types described above.

While the invention has been illustrated and described as embodied in a conical type of centrifugal screening apparatus with or without a spiral conveyor element, it is not intended to be limited to the details shown, since various modifications and structural changes may be made without departing from the spirit of the present invention.

Furthermore, while the operation of the invention has been illustrated in connection with the centrifugation of sugar crystal slurry and further in connection with the preceding evaporation and crystallization operation, it will be understood that the invention is applicable also to the treatment of other slurries or pulp which may benefit from the counter-current washing operation in this machine. An example of a typical pulp is paper pulp.

I claim:

A continuous screening centrifuge for separating solids from pulps or slurries comprising:
(a) a rotatable screen having a feed end and a discharge end;
(b) first, intermediate, and last stationary annular receiving chambers surrounding said screen and functionally dividing said screen into respective first, intermediate, and last treatment zones;
(c) a spiral conveying element positioned coaxially within said screen and rotatable at a speed differential relative thereto to move slurry solids on said screen from said feed end to said discharge end;
(d) first conduit means arranged to admit feed slurry into the first treatment zone for centrifugal separation of slurry solids from slurry liquor, the latter passing through the screen into said first receiving chamber;
(e) last conduit means arranged to admit wash liquid into the last treatment zone for centrifugal washing of the slurry solids therein, the wash liquor from from the last treatment zone passing through said screen into said last receiving chamber;
(f) intermediate conduit means arranged to admit at least a portion of the wash liquor from said last receiving chamber to the intermediate treatment zone for centrifugal washing of the slurry solids therein, the wash liquor from the intermediate treatment zone passing through said screen into said intermediate receiving chamber;
(g) said last and sail intermediate conduit means comprising respective separate ducts provided in said conveying element.

References Cited by the Examiner

UNITED STATES PATENTS

| | | | |
|---|---|---|---|
| 1,569,778 | 1/1926 | Murphy | 210—215 X |
| 2,734,635 | 2/1956 | Holzenthal | 210—196 X |
| 2,870,912 | 1/1959 | Mathieu | 210—374 X |
| 2,883,054 | 4/1959 | Sanchez | 210—380 X |
| 3,011,647 | 12/1961 | Elsken | 210—374 |
| 3,063,981 | 11/1962 | Cochrane et al. | 210—376 X |

FOREIGN PATENTS 866,853   5/1961   Great Britain.

REUBEN FRIEDMAN, *Primary Examiner.*

J. DECESARE, *Assistant Examiner.*